US009293032B2

(12) United States Patent
Linebarger, Jr. et al.

(10) Patent No.: US 9,293,032 B2
(45) Date of Patent: Mar. 22, 2016

(54) TWO-WAY COMMUNICATION FOR CONTROL OF AN ENTERTAINMENT DEVICE

(75) Inventors: John William Linebarger, Jr., Denver, CO (US); Anthony George Dower, III, Parker, CO (US); Henry Gregg Martch, Parker, CO (US); Leslie Ann Harper, Highlands Ranch, CO (US); Jan Johnson, Castle Rock, CO (US); David Arthur Innes, Littleton, CO (US); Joshua Alan Gatewood, Castle Rock, CO (US); Matthew Paul Zenthoefer, Centennial, CO (US); William Michael Beals, Englewood, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 1200 days.

(21) Appl. No.: 11/618,017

(22) Filed: Dec. 29, 2006

(65) Prior Publication Data

US 2008/0158003 A1 Jul. 3, 2008

(51) Int. Cl.
*G05B 11/01* (2006.01)
*G08C 17/02* (2006.01)
*G08C 23/04* (2006.01)

(52) U.S. Cl.
CPC ................ *G08C 17/02* (2013.01); *G08C 23/04* (2013.01); *G08C 2201/63* (2013.01)

(58) Field of Classification Search
CPC .................................. G08C 19/28; H04L 7/00
USPC ............................. 340/825.72, 5.64; 341/176
See application file for complete search history.

(56) References Cited

U.S. PATENT DOCUMENTS

| | | | | |
|---|---|---|---|---|
| 4,959,810 A | | 9/1990 | Darbee et al. | |
| 5,115,236 A | | 5/1992 | Kohler | |
| 5,142,397 A | * | 8/1992 | Dockery | 398/126 |
| 5,228,077 A | | 7/1993 | Darbee | |
| 5,255,313 A | | 10/1993 | Darbee | |
| 5,386,251 A | | 1/1995 | Movshovich | |
| 5,414,761 A | | 5/1995 | Darbee | |
| 5,552,917 A | | 9/1996 | Darbee et al. | |
| 5,629,868 A | | 5/1997 | Tessier et al. | |
| 5,689,353 A | | 11/1997 | Darbee et al. | |

(Continued)

FOREIGN PATENT DOCUMENTS

| | | |
|---|---|---|
| JP | 2002 058080 A | 2/2002 |
| KR | 2006 0020109 A | 3/2006 |
| WO | 03/103290 A | 12/2003 |

OTHER PUBLICATIONS

International search report and written opinion mailed Dec. 22, 2008.

*Primary Examiner* — Vernal Brown
(74) *Attorney, Agent, or Firm* — Seed IP Law Group PLLC

(57) ABSTRACT

Systems and devices for controlling at least one entertainment device include at least one remote in two-way communication with a base device. Memories of the remote and the base device are operable to store substantially the same data as the other such that if the remote or base device fails, data in the memory of the non-failing device is loaded into a memory of a replacement device. A memory of a second remote may also store the same data as the remote memory such that if either the first remote or the base device fails, data in the memory of the second remote is loaded into a memory of a replacement device.

46 Claims, 3 Drawing Sheets

(56) References Cited

U.S. PATENT DOCUMENTS

| | | | | |
|---|---|---|---|---|
| 5,781,784 | A | 7/1998 | McKinley | |
| 5,959,539 | A * | 9/1999 | Adolph et al. | 340/3.5 |
| 5,963,624 | A | 10/1999 | Pope | |
| 6,040,829 | A * | 3/2000 | Croy et al. | 715/864 |
| 6,133,847 | A * | 10/2000 | Yang | 340/825.22 |
| 6,255,961 | B1 | 7/2001 | Van Ryzin et al. | |
| 6,384,737 | B1 * | 5/2002 | Hsu et al. | 340/12.23 |
| 6,404,779 | B1 | 6/2002 | Silvers | |
| 6,532,592 | B1 | 3/2003 | Shintani et al. | |
| 6,545,587 | B1 | 4/2003 | Hatakeyama | |
| 6,724,339 | B2 * | 4/2004 | Conway et al. | 341/176 |
| 6,745,303 | B2 * | 6/2004 | Watanabe | 711/161 |
| 6,956,496 | B1 | 10/2005 | Herz | |
| 7,009,528 | B2 | 3/2006 | Griep | |
| 7,046,161 | B2 | 5/2006 | Hayes | |
| 7,046,163 | B2 | 5/2006 | Macey | |
| 7,093,003 | B2 | 8/2006 | Yuh et al. | |
| 7,119,710 | B2 | 10/2006 | Hayes et al. | |
| 7,167,913 | B2 | 1/2007 | Chambers | |
| 7,218,243 | B2 | 5/2007 | Hayes et al. | |
| 7,221,285 | B1 | 5/2007 | Hamilton | |
| 7,429,932 | B1 * | 9/2008 | Newell et al. | 340/12.24 |
| 2005/0155081 | A1 | 7/2005 | Chiou | |
| 2006/0041655 | A1 | 2/2006 | Holloway et al. | |
| 2006/0048194 | A1 | 3/2006 | Poslinski | |

* cited by examiner

TWO-WAY COMMUNICATION FOR CONTROL OF AN ENTERTAINMENT DEVICE

FIELD OF THE INVENTION

The present invention relates to a system and apparatus for two-way communication relating to control of an entertainment device.

BACKGROUND OF THE INVENTION

Multiple component audiovisual systems are typically complex systems requiring control of multiple components, each having multiple functionalities and settings. As these systems continue to increase in complexity and functionality, so too do the remote control devices utilized to control the systems.

Many remote devices provide for control of one or more entertainment devices or components by programming the device to be capable of communicating with each device or component. One problem with such remotes is that if the remote fails, another remote must be obtained and programmed with the same information previously contained in the original remote. Similarly, if the base fails, another base device most be obtained and programmed with the same information previously contained in the original base device. Another problem with battery-operated remotes as they become more complex, and thus require more energy for operation, is the quick depletion of battery power. Yet another problem with systems having multiple components and multiple remotes is that walls or obstacles between a remote and component may cause a lack of communication between those systems and devices and the remote. Another common problem that inhibits successful communication between the remote and base or entertainment device is lack of customer education regarding programming or operating the remote.

There is a need in the art, therefore, for an improved remote control and system for controlling one or more entertainment devices.

BRIEF SUMMARY OF THE INVENTION

One implementation conforming to certain characteristics of the present invention relates to a remote device having a transmitter, a receiver, a processor operably coupled with the transmitter and the receiver, and a memory operably coupled to the processor. The receiver is operative to receive at least one signal from a base.

Another embodiment relates to a base device having a transmitter, a receiver, a processor operably coupled with the transmitter and the receiver, a memory operably coupled to the processor, and an operable connection to the entertainment device. The receiver is operative to receive at least one signal from a remote.

Another implementation is a system for controlling an entertainment device. The system has a base operably coupled to the entertainment device and a remote operative to control at least the base. The remote has a remote transmitter, a remote receiver, a remote processor operably coupled with the remote transmitter and the remote receiver, and a remote memory operably coupled to the remote processor. The remote receiver is operative to receive at least one signal from the base.

According to one embodiment, a further implementation relates to a method of preventing the loss of settings and data in a remote for controlling an entertainment device. The method includes transmitting data from a first base to a memory of a first remote, such that data is stored in both the first base and the first remote, wherein the first base is operably coupled to the entertainment device.

In yet another embodiment, a further implementation relates to a method of preventing the loss of settings and data in a base. The method includes transmitting data from a remote to a memory of a base, such that data is stored in both the base and remote, wherein the base is operably coupled to the entertainment device.

Another method according to one implementation relates to a method of conserving power in a remote for controlling an entertainment device. The method includes placing a remote in a sleeping mode after a predetermined period of non-use. The sleeping mode includes predetermined operational intervals to detect a signal. The method further includes transmitting a wake signal from a base to the remote, receiving the wake signal at the receiver of the remote during one of the predetermined operational intervals, and waking the remote in response to receiving the wake signal.

A further implementation relates to a method of operation, maintenance, or repair of a remote for controlling an entertainment device. The method includes providing a base and a remote. The base is operably coupled to the entertainment device and further operably coupled to a network. The remote has a receiver and a memory. The method further includes transmitting a signal from an external system to the base via the network, and transmitting a signal to the remote based on the signal from the external system. In one embodiment, the signal can actuate the remote to transmit a signal to the entertainment device or base.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The present invention relates to a two-way communication system for the operation of at least one entertainment device. One exemplary embodiment relates to a remote control for controlling an entertainment device, wherein the remote can send and receive signals and store data in its memory. Another embodiment relates to a base such as, for example, a set-top box, that can communicate with one or more remotes and/or entertainment devices. In a further implementation, a system is provided having at least one remote and at least one base in operable communication with each other for operation and control of at least one entertainment device.

The system, according to one exemplary implementation, provides data storage capabilities across devices that help prevent data loss. In another implementation, the system provides energy conservation through devices that can transition between an operating mode and a sleeping mode and can be "woken," or switched to the operating mode, by a signal from another device. The system also alternatively allows integration of multiple entertainment devices and multiple remotes across multiple rooms or other locations and provides relatively seamless communication between a base device and the multiple remotes despite the varied locations of the remotes in relation to the base. Further, the system, according to one alternative aspect, may allow communication with one or more external systems, such as a customer service entity, over a network.

Figure 1:
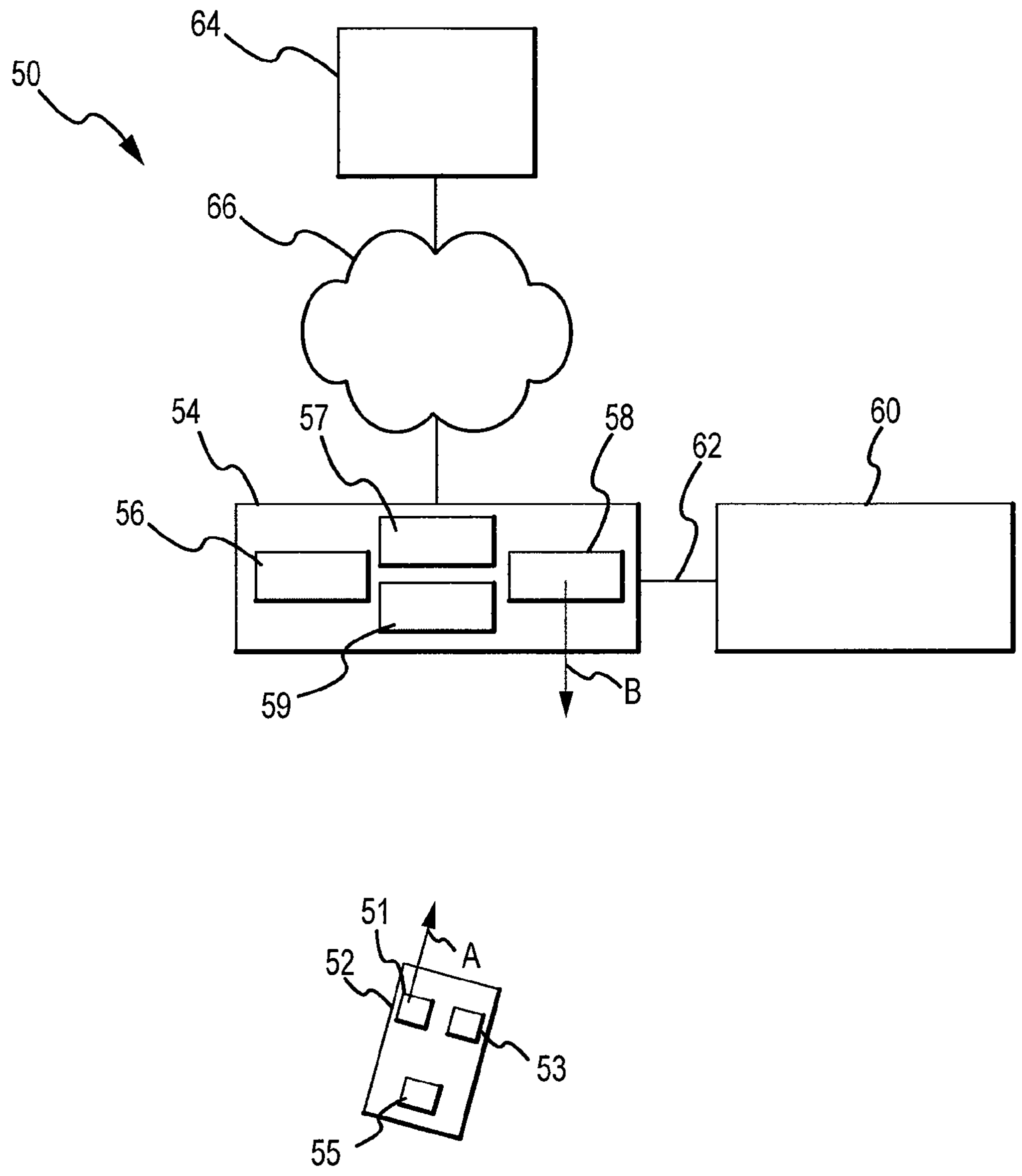
FIG. 1 is a schematic depiction of a system comprising a remote and a base operably coupled to an entertainment device, according to one embodiment.

FIG. 1 depicts a system conforming to certain characteristics of an exemplary embodiment. The system 50 has a remote control 52 and a base 54 that function together to control an entertainment device 60. The remote 52 and the base 54 are configured to communicate with each other and optionally other devices, including the entertainment device 60. In addition, the base is coupled to the entertainment device 60 via an operable connection 62. In one alternative implementation, the base 54 is operably coupled to an external system 64 via network 66.

Figure 2:
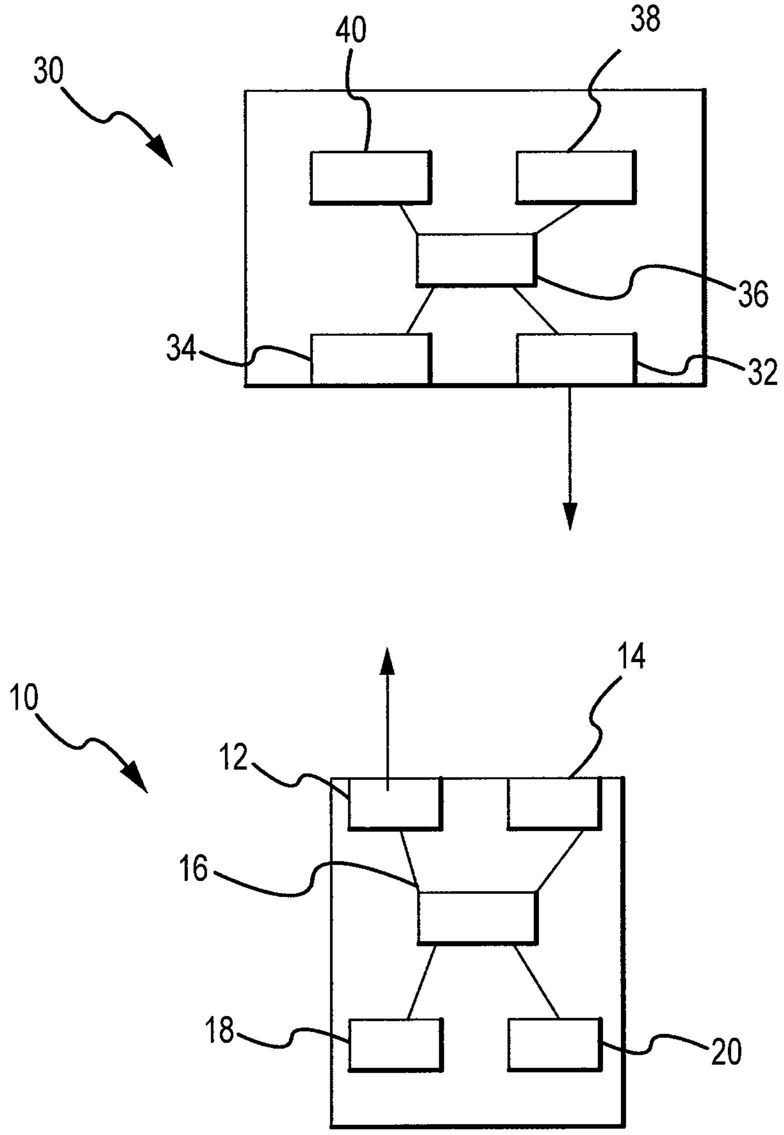
FIG. 2 is a schematic depiction of a remote in communication with a base, according to another embodiment.

In accordance with one embodiment, certain basic components of the remote and the base are generally the same. FIG. 2 depicts a remote 10 and base 30 capable of wireless communication with each other, both according to one implementation. The remote 10 has a transmitter 12, a receiver 14 and a processor 16 coupled to both. In addition, the remote 10 has a memory 18 and a user interface 20, each also typically coupled to the processor 16. The memory 18 stores data and the user interface 20 allows the user to control the remote 10. That is, the user can utilize the interface 20 to receive information, initiate transmission of signals via the transmitter 12, and perform other operations with respect to the remote 10. Similarly, the base 30 has a transmitter 32, a receiver 34, a memory 38, and user interface 40, all operably coupled to the processor 36.

The memory components 18, 38 of each device can be any type of memory. For example, the memory can be volatile or non-volatile, magnetic, optical, random-access or other flash memory, and so forth. In addition, the remote 10 and base 30 are capable of transmitting any known type of signal. That is, the signal could be a wired signal (i.e., transmitted over a wire or cable) or wireless. The wireless signal could be an infra-red signal, a ultra-high frequency (UHF) signal, a very high frequency (VHF) signal, a Bluetooth™ signal, a radio frequency (RF) signal, or any other wireless signal.

Returning to FIG. 1, in use, each of the remote 52 and base 54 can communicate with each other and other devices (including the entertainment device 60) by transmitting and receiving signals. For example, the remote 52 can transmit a control signal through its transmitter 51 (as shown schematically by the arrow A) to the receiver 56 of the base 54, or to the entertainment device 60. Similarly, the base 54 can transmit signals via its transmitter 58 to the receiver 53 of the remote 52 or to another device. Each of the remote 52 and the base 54 can also store information in their memories 55, 57, respectively. For example, the base 54 can transmit data via a signal to the receiver 53 of the remote 52 to be stored in the remote's memory 55. Similarly, the remote 52 can transmit a signal containing data to the receiver 56 of the base 54 to be stored in the base memory 57.

The remote 52 may be any remote unit operative to control an entertainment device that has signal receiving capabilities and, optionally, a memory. In one embodiment, the remote is handheld. The base 54 is any base unit or device operative to communicate with and function with the remote 52. According to one implementation, the base is a set-top receiver. Alternatively, the base can be a component in an audiovisual system, such as a separate unit stacked with other components of the system. In a further alternative embodiment, the base is integrated into a television or an audiovisual component such as a receiver.

Any type of data can be transmitted in a signal by either device, in accordance with one exemplary embodiment. For example, the data could be data currently stored in the base 54 ("existing base data"), new data intended for storage in the base 54 ("new base data"), data currently stored in the remote 52 ("existing remote data"), new data intended for storage in the remote 52 ("new remote data"), data currently stored in the entertainment device 60 ("existing entertainment device data"), and/or new data intended for storage in the entertainment device 60 ("new entertainment device data"). Such existing data could be operational or functionality programs or any other types of data typically stored in the appropriate device. For example, according to one embodiment, the existing data includes identification information that identifies the device from which it is transmitted. Further, the new data could be for replacement or repair of a faulty existing program, a new program, or other types of new data providing new or enhanced operation or functionality to the device. More specific examples of data contemplated herein include, but are not limited to, any kind of data useful for operation of an entertainment device or base or remote, including timer data, recording schedules, download schedules, data relating to blocked or locked channels, stations or functionalities ("parental lock settings"), caller identification data, data relating to programmed settings for an audio or visual entertainment device (such as, for example, programmed surround sound settings, aspect ratios, etc.), data relating to favorite channels, preset radio station data, data relating to address, band, modulator channel, television settings (including HDTV settings), shared view, Dolby™ Digital, local channels scanned, guide display, alternate audio, time updates, record plus, channel order, closed caption settings, inactivity standby settings, or any other operational or functionality data.

According to one embodiment of the system, the system is configured to prevent or mitigate the loss of data. That is, data stored in the memory 57 of the base 54 can also be stored in the remote memory 55 as a "failsafe," or vice versa. More specifically, data stored in the base memory 57 can be transmitted by the base transmitter 58 to the receiver 53 of the remote 52 and stored in remote memory 55. Similarly, data stored in the memory 55 of the remote 52 can be transmitted to the receiver 56 of the base and stored in the base memory 57.

Such dual data storage provides a backup in the event of a device failure. That is, if either of the remote 52 or the base 54 were to fail for any reason, the data stored in the failed device would be available in the other non-failing device. For example, if the remote 52 were to fail and the data from the remote 52 had been previously transmitted to the base 54 and stored in the base memory 57, then the data would be available to be loaded into a replacement remote. Thus, the data could be transmitted via the transmitter 58 of the base 54 to the receiver of the replacement remote (not shown), and thus loaded into the memory of the replacement remote. Similarly, if the base 54 were to fail for any reason and the data from the base 54 had been previously transmitted to the remote 52 and stored in the remote memory 55, then the data could be transmitted via the remote transmitter 51 to the receiver of the replacement base (not shown).

Data can also be shared between two different remotes, in accordance with one implementation conforming to certain characteristics of an exemplary embodiment. According to one embodiment, a second remote (not shown) may control a second entertainment device (not shown). Alternatively, the second remote may be a backup remote. Data is stored in both remotes in the following manner. The data stored in the memory 55 of the first remote 52 is transmitted to the second remote (not shown). The data is received at the receiver of the second remote and then stored into the memory of that remote. As a result, both the first remote 52 and the second remote (not shown) have the same data in their memories and either can serve as backup to the other. Alternatively, both remotes can be used with separate entertainment devices with the benefit of the same stored data.

In a further implementation, the system is configured to provide for recognition between devices. That is, according to one embodiment, both the base 54 and remote 52 transmit identification information that specifically identifies the transmitting device, and the device receiving the signal (regardless of whether the receiving device is the base 54 or the remote 52) is configured to recognize or identify the transmitting device based on the identification information. According to one embodiment, both devices transmit such identification information in every signal. Alternatively, the devices transmit the identification information only in certain types of signals. When either of the base 54 or remote 52 receives the identification information at its receiver, 56 or 53, respectively, the processor of the receiving device is configured to recognize the identification information.

According to one embodiment relating to a system having at least two bases and at least two remotes, the device recognition capability described in the previous paragraph can be utilized to ensure that the correct remote is used with the correct base. For example, in an embodiment having a first base operably coupled to a first entertainment device in a first room and configured to communicate with a first remote (not shown), and further having a second base operably coupled to a second entertainment device in a second room configured to communicate with a second remote (not shown), both bases can recognize both remotes. That is, if a user inadvertently attempts to transmit a signal from the first remote to the second base, the second base recognizes the first remote and communicates to the user that the user is inadvertently using the wrong remote. According to one embodiment, the second base communicates this information to the user via the second base user interface. Similarly, if a user inadvertently attempts to transmit a signal from the second remote to the first base, the first base recognizes the second remote and communicates to the user that the user is inadvertently using the wrong remote.

According to one embodiment relating to device recognition, once the base has communicated the error to the user, the system of this embodiment can provide the user with at least one of three options. One option would be for the user to obtain the correct remote. Another option would be for the user to allow the base to reprogram the remote to operate with that base by transmission of information from the base as described in further detail elsewhere herein. Yet another option would be for the user to allow the base to contact an external system over a network to obtain a corrective instruction from the external system (such as, for example, a signal that programs the remote to operate with both bases), as also described in further detail elsewhere herein.

According to a further alternative, the device recognition capability can be utilized with a system having any number of remotes and bases.

Another embodiment provides communication for purposes of routine maintenance or diagnostics. For example, according to the embodiment, the base 54 transmits a signal to confirm the presence of the remote 52 within an operational range of the base 54. The signal is transmitted to the remote 52 and may prompt the remote 52 to transmit a confirming signal back to the base 54. In the event that the remote 52 is not within operational range of the base 54 (that is, the remote receiver 53 fails to receive or acknowledge the signal because the remote 52 is outside a communication range with the base 54, is in another room, has experienced an operational failure of some kind, or for any other reason), the remote receiver 53 will not receive the signal and/or the remote transmitter 51 will be incapable of transmitting the confirming signal back to the base 54. When the base 54 has not received the confirming signal from the remote 52 for a predetermined period of time, the base 54 can so indicate to a user via the user interface 59. For example, according to one implementation, the base 54 emits an alarm or provides some other kind of notification to the user that the remote 52 is not responding to its diagnostic signal. In addition, the base 54 can operate in a similar fashion to determine the status of one or more entertainment devices or one or more additional remotes. Alternatively, a similar routine maintenance or diagnostic signal can originate from the remote 52 and operate in the same fashion to confirm the status of the base 54, one or more entertainment devices, and/or one or more additional remotes. In a further alternative, the routine diagnostic signal is transmitted from one device to another to confirm that the data stored in the devices match, and if the data does not match, that information is provided via the user interface of one of the devices.

Another embodiment of a system is configured to conserve energy at the remote. The system 50 depicted in FIG. 1 will be used as an exemplary embodiment. The remote 52 has an operating mode and a sleeping mode. In one aspect, the remote 52 consumes less energy while in the sleeping mode. "Sleeping mode," as used herein, is defined as a state in which the device consumes less energy than while in the operating mode.

In the sleeping mode, according to one aspect, the receiver 53 of the remote 52 is operational for some predetermined period of time. For example, in the sleeping mode, the receiver 53 may be operational at predetermined repeating intervals. In one embodiment, the receiver 53 is operational for a predetermined period of each minute in the sleeping mode. For example, in one aspect, the receiver 53 is operational for two seconds and then non-operational for eight seconds in repeating intervals. Alternatively, the remote receiver 53 is operational for a predetermined period of each second in the sleeping mode. While operational, the receiver 53 is capable of recognizing a signal. Thus, if any signal is transmitted towards the remote 52 while the remote is in the sleeping mode, the receiver 53 would recognize that signal during the operational phase of the sleeping mode.

According to one embodiment, the remote 52 is "awakened" from its sleeping mode by the transmission of a wake signal from the base 54 to the remote 52. That is, the signal is transmitted from the transmitter 58 of the base 54 and detected by the remote receiver 53 during an operational phase of the receiver 53. The signal is processed by the remote and causes the remote 52 to wake. In other words, the remote 52 switches from the sleeping mode to operating mode. Alternatively, the wake signal can be transmitted from another device, such as a second remote (not shown).

In a further alternative embodiment, the base 54 has an operating mode and a sleeping mode as described above for the remote 52 and can be "woken" by a signal from the remote 52 or another remote or device. In yet another alternative, the same type of energy-conserving sleeping mode and waking functionality can be provided for any one or more entertainment devices. In still another alternative, each of the remote 52, the base 54, and the entertainment device 60 have a sleeping mode and operating mode. For example, all three (the remote 52, the base 54, and the entertainment device 60) can be in sleeping mode and can be "woken" by a signal from any one of the three or from another device. In one embodiment, a user can actuate any of the devices to transmit the signal that causes one or more of the devices to switch to operating mode.

Figure 3:
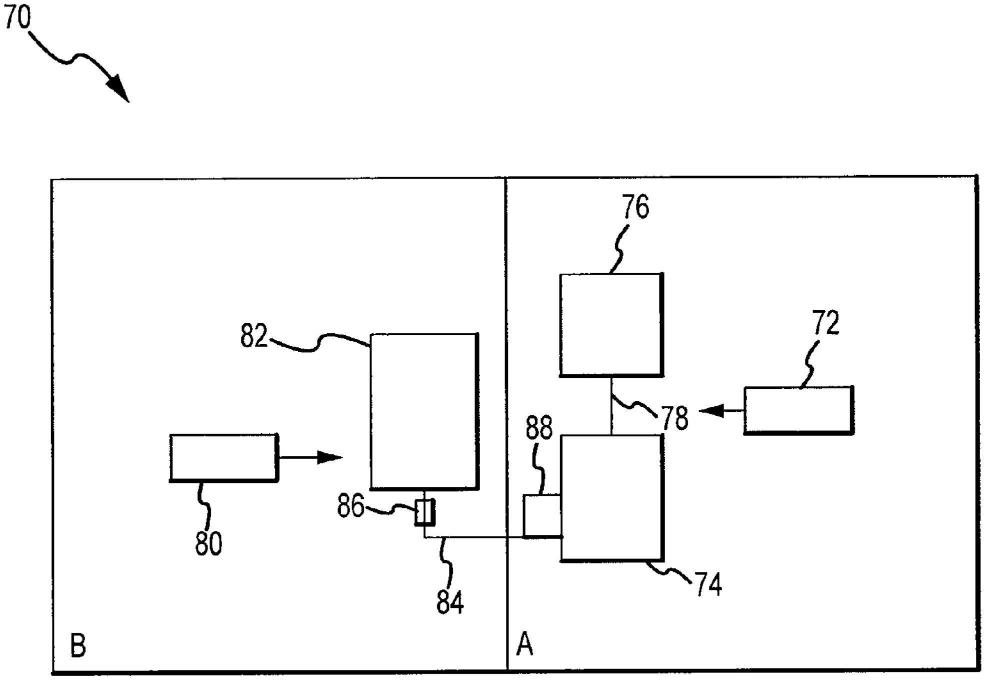
FIG. 3 is a schematic depiction of a system comprising two remotes and a base operably coupled to two entertainment devices, according to a further embodiment.

FIG. 3 depicts another system conforming to certain characteristics of an exemplary embodiment that includes more than one entertainment device and thus more than one remote. In this embodiment, a base 74 is coupled by operable connection 78, 84 to two different entertainment devices 76, 82. The base 74 and entertainment device 76 along with the remote 72 are in room A while the second entertainment device 82 and the second remote 80 are in room B. Remote 72 can transmit signals to the base 74 and the entertainment device 76. More specifically, the remote 72 can transmit any wireless signal, such as an infrared, UHF, Bluetooth™, RF, or VHF signal, to either of those devices. Thus, the components in room A operate in generally the same fashion as the components depicted in FIG. 1. On the other hand, in the embodiment depicted in FIG. 3, the remote 80 in room B cannot successfully transmit all types of wireless signals to the base 74. That is, while the remote 80 can transmit certain signals directly to the base 74, such as a UHF signal, the remote 80 cannot transmit certain other signals, such as an infrared signal, to the base 74.

To overcome this communication limitation relating to additional remotes and entertainment devices, the system shown in FIG. 3 includes a transceiver 86 that is operably coupled to the operable connection 84 between the base 74 and the entertainment device 82. The transceiver 86 is capable of transmitting or receiving signals. As such, the transceiver 86 facilitates the remote 80 and the base 74 transmitting and receiving signals between each other despite being in different rooms (or in any other configuration that prevents transmission and receipt of direct IR signals between the two devices). For example, the remote 80 can transmit a signal to the receiver 86 which is then received at the base 74 via the operable connection 84. According to one embodiment, the operable connection 84 also includes a separate signal inline 88, which provides a separate line for the base to receive the signal that was received at the transceiver 86. Similarly the base can transmit to the remote 80 by transmitting a signal along the operable connection 84 and then transmitting that signal from the transceiver 86 to the remote 80. It is understood that the operable connection 84 can be configured in any fashion that provides for communication between the transceiver 86 and the base 74. It is also understood that this embodiment could be used in several types of environments beyond devices in two rooms. As such, any environment in which a second remote cannot successfully transmit signal to or receive signals from the base would benefit from this system. For example, the same general configuration could be used in a multi-room home or business having a single base and multiple entertainment devices and associated remotes.

It is understood that the transceiver 86 is exemplary. According to an alternative embodiment, any component capable of transmitting and receiving signals can be operably coupled to the operable connection 84. In a further alternative embodiment, separate transmitter and receiver components can be operably coupled to the connection 84. Further, one of skill in the art would understand that the transceiver 86 can be positioned anywhere in the configuration so long as it is still capable of exchanging signals with the second remote 80. That is, the transceiver 86 can be integrated into the second entertainment device 82, attached to an external portion of the entertainment device 82 and operably coupled to the connection 84, or otherwise positioned in any fashion that still permits operable connection to the base 74 and communication with the second remote 80.

A system according to another embodiment provides for more than one base, each in communication with each other and with one or more remotes and one or more entertainment devices in a fashion similar to the various system embodiments described herein.

Returning to FIG. 1, another alternative embodiment of a system provides for communication with an external system. That is, the base 54 can transmit signals to and receive signals from an external system 64 over a network 66. In one embodiment, the network 66 is a local area network. Alternatively, the network 66 is the Internet or a proprietary satellite downlink. In a further alternative, the network 66 is any network that allows for communication with at least one external system 64. Communication with multiple external systems 64 is also contemplated.

In one exemplary embodiment, the external system 64 is a provider system such as a system operated by the company that marketed the system depicted in FIG. 1 or by a customer service entity related thereto. For example, a user of the system 50 might contact a customer service representative regarding some maintenance, repair, or operational issues. In this example, the company or customer service entity utilizes the communication between the external system 64 and the base 54 to remotely operate the system 50. More specifically, the service representative or other service provider can use the external system 64 to remotely provide hands-on assistance and operational input relating to the system 50. For example, the service provider can activate the system 64 to transmit a signal over the network 66 to the base 54. This signal may be related to installation, operation, maintenance, repair, diagnostics, or enhancement of the system 50. In one embodiment, the signal transmitted to the base 54 includes instructions to transmit a signal to the remote 52. This signal is transmitted by the transmitter 58 to the receiver 53. The signal might include instructions for an action at the remote 52. That is, the remote 52 is actuated by the instructions in the signal from the base 54 to transmit a signal, or perform some other action, related to the operational, repair, maintenance or diagnostic issue initially raised by the user. The signal transmitted from the remote 52 may be a signal transmitted to the base 54, the entertainment device 60, or some other device.

Alternatively, the signal transmitted to the base 54 from the external system 64 includes instructions to transmit a signal to the entertainment device 60 or to another device such as a second remote (not shown) or another entertainment device (not shown). That is, the signal from the external system 64 can be used to activate communication between the base and any other device in operable communication with the system 50.

Further, this system 50, according to one embodiment, also facilitates the base 54 transmitting a signal to the external system 54. For example, a response signal may be transmitted to the external system 64 upon completion of the action originally received as an instruction from the external system 64. Alternatively, any other exchange across the network 66 can be accomplished that may provide some operational, repair, maintenance, or diagnostic action for the present system 50.

In one embodiment, the signal transmitted from the base 54 to the remote 52, in addition to or alternatively to including instructions that remote 52 perform an action, could include data to be stored at the remote 52, such as data relating to a new function. As such, the signal would be received at the receiver 53 and then stored in the memory 55 of the remote 52. In a further alternative, the signal transmitted from the base 54 could include any data or instructions that might be useful for the operation, maintenance, repair, or diagnostics of the system 50.

In addition to utilizing the external communication capabilities provided in the system 50 for purposes of enhanced customer service support as discussed above, the external communication capabilities could also be used for any situation that might call for exchanging signals between the system 50 and an external system 64. For example, an authorized service provider, such as an entity responsible for system maintenance and repair, might regularly transmit a diagnostic signal to the base 54 that activates the base 54 to run a program or perform an operation that reviews or analyzes the status of each device on the system and transmit the status information back to the external system 64 of the service provider. In another example, the network 66 connection could be used to enhance the system 50 with an upgrade. That is, the system 50 could be upgraded with enhanced functionalities or capabilities by transmitting from an external system 64 a signal containing a program or other data to be stored in the memory 57 of the base 54 or in the memory of another device of the system 50 (such as the remote 52), wherein the program or other data includes enhanced functionality or capability. In yet another example, the external communication capabilities can be used for installation of new or replacement data in a new or existing device. That is, a signal can be transmitted from an external system 64 that contains data relating to operational or functionality programs to be loaded into a new device. Or, the signal can contain data relating to replacement operational or functionality programs to be loaded into an existing device. In addition, any other type of signal transmission between an external system 64 and the system 50 of FIG. 1 that provides for operation, maintenance, repair, diagnosis, or improvement of the system 50 is contemplated herein.

Although the present invention has been described with reference to preferred embodiments, persons skilled in the art will recognize that changes may be made in form and detail without departing from the spirit and scope of the invention.

What is claimed is:

1. A remote device for controlling an entertainment device, the remote comprising:

(a) a transmitter;

(b) a receiver operative to receive at least one signal from a base;

(c) a processor operably coupled with the transmitter and the receiver; and (d) a memory operably coupled to the processor and storing data that is duplicated in a memory of the base; wherein:

the transmitter of the remote device transmits a diagnostic signal to the base to confirm status of the base;

the receiver of the remote device receives an indication that the base has failed in response to the diagnostic signal sent to the base; and in response to the received indication that the base has failed, the processor of the remote device programs a replacement base to be controlled by the remote device to replace the base with the replacement base, including transmission of a functionality program in the memory of the remote device, that is also duplicated in the memory of the base, to the replacement base via the transmitter when the receiver receives the indication that the base has failed.

2. The remote device of claim 1, wherein the remote is a handheld remote control.

3. The remote device of claim 1, wherein the at least one signal is a wireless transmission.

4. The remote device of claim 3, wherein the at least one signal is an infrared signal.

5. The remote device of claim 3, wherein the at least one signal is an ultra-high frequency signal.

6. The remote device of claim 1, wherein the functionality program includes recording timers and parental lock settings.

7. A remote device for controlling an entertainment device, the remote comprising:

(a) a transmitter;

(b) a receiver operative to receive at least one signal from a base;

(c) a processor operably coupled with the transmitter and the receiver; and (d) a memory operably coupled to the processor and storing data that is duplicated in a memory of a second remote; wherein the transmitter of the remote device transmits a diagnostic signal to the second remote to confirm status of the second remote;

the receiver of the remote device receives an indication that the second remote has failed in response to the diagnostic signal sent to the second remote; and in response to the received indication that the second remote has failed, the processor of the remote device programs a replacement remote for the second remote to control the entertainment device to replace the second remote with the replacement remote, including transmission of a functionality program in the memory of the remote device, that is also duplicated in the memory of the second remote, to the replacement remote for the second remote via the transmitter when the receiver receives the indication that the second remote has failed.

8. The remote device of claim 1, wherein the remote has an operating mode and a sleeping mode, wherein the sleeping mode comprises the receiver being operational at predetermined repeating intervals, wherein the receiver is operative to be capable of recognizing a signal while operational.

9. The remote device of claim 8, wherein the remote is operative to switch from the sleeping mode to the operating mode when the receiver recognizes a wake signal from the base.

10. A base device for controlling an entertainment device, the base comprising:

(a) a transmitter;

(b) a receiver operative to receive at least one signal from a remote;

(c) a processor operably coupled with the transmitter and the receiver;

(d) a memory operably coupled to the processor and storing data, the data duplicated in a memory of the remote; and (e) an operable connection to the entertainment device; wherein the transmitter of the base device transmits a diagnostic signal to the remote to confirm status of the remote;

the receiver of the base device receives an indication that the remote has failed in response to the diagnostic signal sent to the remote; and in response to the received indication that the remote has failed, the processor of the base device programs a replacement remote for the remote to control the entertainment device to replace the remote with the replacement remote, including transmission of a functionality program in the memory of the base device, that is also duplicated in the memory of the remote, to the replacement remote via the transmitter when the receiver receives the indication that the remote has failed.

11. The base device of claim 10, wherein the base device is a set-top box.

12. The base device of claim 10, wherein the at least one signal is a wireless transmission.

13. The base device of claim 10, wherein the memory stores data duplicated in a memory of a second remote and when one of the base or the second remote fails, data in the memory of the non-failing device is loaded into a memory of a replacement device.

14. The base device of claim 10, wherein the base is operably coupled with an external system over a network, wherein the base is operative to receive a signal from the external system.

15. The base device of claim 14, wherein the base is operative to transmit a signal to the remote based on the signal from the external system.

16. The base device of claim 15, wherein the remote is operative to perform an action based on the signal from the external system.

17. The base device of claim 14, wherein the base is operative to transmit a signal to the external system based on the signal from the external system.

18. The base device of claim 14, wherein the signal is related to repair, maintenance, diagnostics, or an operational command.

19. The base device of claim 10, further comprising:

(a) an operable connection to a second entertainment device; and (b) a transceiver operably coupled to the operable connection in substantial proximity with the base, wherein the transceiver is operative to transmit signals from the base to a second remote.

20. The base device claim of 19, wherein the first and second entertainment devices are in separate rooms.

21. A system for controlling an entertainment device, the system comprising:

(a) a base operably coupled to the entertainment device, the base comprising a base transmitter, a base receiver, a base processor, and a base memory that stores data;

(b) a remote operative to control at least the base, the remote comprising:

(i) a remote transmitter;

(ii) a remote receiver operative to receive at least one signal from the base;

(iii) a remote processor operably coupled with the remote transmitter and the remote receiver; and (iv) a remote memory operably coupled to the remote processor and storing data duplicating the data stored in the base memory; wherein the transmitter of the base is configured to send a diagnostic signal to the remote to confirm status of the remote;

the receiver of the base is configured to receive an indication that the remote has failed in response to the diagnostic signal sent to the remote; and in response to the received indication that the remote has failed, the base processor is configured to program a replacement remote to control the entertainment device to replace the remote with the replacement remote, including transmission of a first functionality program, the first functionality program stored in the base memory, to the replacement remote via the base transmitter when the base receiver receives the indication that the remote has failed and wherein, the remote transmitter is configured to transmit a diagnostic signal to the base to confirm status of the base;

the remote receiver is configured to receive an indication that the base has failed in response to the diagnostic signal sent to the base; and the remote processor is configured to program a replacement base to be controlled by the remote, in response to the received indication that the base has failed, to replace the base with the replacement base, including by transmission of a second functionality program, the second functionality program stored in the remote memory to the replacement base via the remote transmitter when the remote receiver receives the indication that the base has failed.

22. The system of claim 21, wherein the base is a set-top box.

23. The system of claim 21, wherein the remote is a handheld remote control.

24. The system of claim 21, wherein the at least one signal is a wireless transmission.

25. The system of claim 24, wherein the at least one signal is an infrared signal.

26. The system of claim 24, wherein the at least one signal is an ultra-high frequency signal.

27. The system of claim 21, wherein the functionality program includes recording timers and parental lock settings.

28. The system of claim 21, further comprising a second remote comprising a second remote memory.

29. The system of claim 28, wherein the second remote memory stores data duplicating the data stored in the remote memory and when one of the remote or the second remote fails, data in the memory of the non-failing remote is loaded into a memory of a replacement device.

30. The system of claim 21, wherein the remote has an operating mode and a sleeping mode.

31. The system of claim 30, wherein the sleeping mode comprises the remote receiver being operational for a predetermined period of time.

32. The system of claim 31, wherein the sleeping mode comprises the remote receiver being operational at predetermined repeating intervals.

33. The system of claim 32, wherein the sleeping mode comprises the remote receiver being operational for a predetermined period of each minute.

34. The system of claim 32, wherein the sleeping mode comprises the remote receiver being operational for a predetermine period of each second.

35. The system of claim 31, wherein the remote receiver is operative to be capable of recognizing a signal while operational.

36. The system of claim 35, wherein the remote is operative to switch from the sleeping mode to the operating mode when the remote receiver recognizes a wake signal from the base.

37. The system of claim 21, wherein the base is operably coupled to a network.

38. The system of claim 37, wherein the base is in communication with an external system over the network.

39. The system of claim 38, wherein the base is operative to receive a signal from the external system over the network.

40. The system of claim 39, wherein the base is operative to further transmit a signal to the remote based on the signal from the external system.

41. The system of claim 39, wherein the base is operative to transmit a signal to the external system based on the signal from the external system.

42. The system of claim 39, wherein the signal is related to repair, maintenance, diagnostics, or an operational command.

43. The system of claim 21, further comprising a second remote operative to control a second entertainment device, the second remote comprising a second remote receiver.

44. The system of claim 43, further comprising an operable connection between the base and the second entertainment device.

45. The system of claim 44, further comprising a transceiver operably coupled with the operable connection in proximity with the base, wherein the second remote receiver is operative to receive signals from the base via the transceiver.

46. The system of claim 43, wherein the first and second entertainment devices are in separate rooms.

* * * * *